Figure 1:
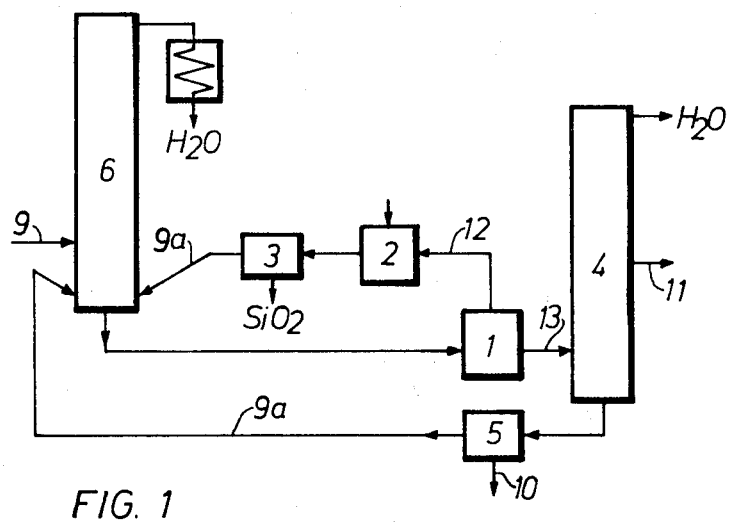

United States Patent [19]
Becker et al.

[11] 3,971,845
[45] July 27, 1976

[54] RECOVERY OF HYDROFLUORIC ACID FROM AQUEOUS FLUOSILICIC ACID

[75] Inventors: Wolf Becker; Wolfgang Weiss, both of Cologne, Germany

[73] Assignee: Bayer Aktiengesellschaft, Germany

[22] Filed: Sept. 26, 1973

[21] Appl. No.: 400,810

[30] Foreign Application Priority Data
Sept. 30, 1972  Germany............................ 2248149

[52] U.S. Cl................................ 423/483; 423/341; 423/488

[51] Int. Cl.² ................. C01B 33/08; C01B 33/10; C01B 33/12; C01B 7/22

[58] Field of Search ........... 423/483, 342, 489, 488, 423/341

[56] References Cited
UNITED STATES PATENTS

| | | | |
|---|---|---|---|
| 1,244,032 | 10/1917 | Chappell............................ | 423/483 |
| 3,218,124 | 11/1965 | Oakley, Jr. et al. ................ | 423/483 |
| 3,218,125 | 11/1965 | Houston et al. .................... | 423/483 |
| 3,218,128 | 11/1965 | Klem................................... | 423/483 |
| 3,455,650 | 7/1969 | Conte et al. ........................ | 423/483 |
| 3,758,674 | 9/1973 | Parish et al......................... | 423/489 |
| 3,773,907 | 11/1973 | Blochl et al........................ | 423/483 |
| 3,855,399 | 12/1974 | Van Eiji.............................. | 423/488 |

*Primary Examiner*—Edward Stern
*Attorney, Agent, or Firm*—Connolly and Hutz

[57] ABSTRACT

Recovery of hydrofluoric acid from aqueous fluosilicic acid by treating said aqueous fluosilicic acid at a temperature of from 100° to 300°C. and under a pressure of from 3 to 80 atmospheres and separating resulting hydrogen fluoride containing aqueous phase and silicon tetrafluoride containing gaseous phase and optionally hydrolyzing the silicon tetrafluoride containing gaseous phase in aqueous medium and recycling the aqueous fluosilicic acid to the process as starting material.

5 Claims, 2 Drawing Figures

RECOVERY OF HYDROFLUORIC ACID FROM AQUEOUS FLUOSILICIC ACID

This invention relates to a process for working up aqueous fluosilicic acids to yield hydrofluoric acid together with silicon tetrafluoride or silicon dioxide. The process is particularly suitable for working up fluosilicic acids of the kind obtained from the scrubbing of spent gases in the phosphate industry or from other sources of fluorine.

Increasing quantities of aqueous fluosilicic acids of different concentration are accumulating as secondary products in fluorine chemistry and, in particular, in the purification of spent gases containing fluorine. Some of these aqueous solutions can be worked up to yield salts of fluosilicic acid. There are also processes by which fluosilicic acid can be converted into aluminum trifluoride or cryolite and $SiO_2$. However, processes which enable the fluosilicic acid to be used as a starting material for the production of hydrofluoric acid are of the greatest commercial interest.

Unfortunately, conventional processes are attended by a number of disadvantages. For example in the processes described in Swiss Patent Specification Nos. 411,810 and 455,722, dilute sulphuric acid accumulates as a secondary product whilst, in another known process, as described in (Japanese Patent Application No. 20 134/71), salts which can only be used in special cases are formed as secondary products. Other proposals, for example according inter alia to U.S. Pat. No. 3,574,542, German Auslegeschrift No. 1,258,844 and German Offenlegungsschrift No. 1,816,377, necessitate the use of high temperatures and, for this reason, are expensive in terms of energy.

The process disclosed in German Auslegeschrift No. 1,271,086 uses organic solvents, whilst other proposed methods, for example according to German Auslegeschrift No. 1,263,718 or German Offenlegungschrift No. 1,767,465, require a number of intermediate compounds to arrive at the desired end product.

We have now found a process for working up aqueous fluosilicic acids by separating the fluosilicic acid into hydrogen fluoride and silicon tetrafluoride and, optionally, hydrolysing the silicon tetrafluoride into silicic acid, which process is characterised by the fact that the aqueous fluosilicic acid solutions are separated at an elevated temperature and pressure into an aqueous phase containing hydrogen fluoride and a gaseous phase essentially containing silicon tetrafluoride, and optionally the aqueous phase containing hydrogen fluoride is concentrated by distillation at atmospheric or reduced pressure, preferably at a pressure of from 50 to 300 mm Hg, the residual fractions of fluosilicic acid being left in the residue.

The process according to the invention is further characterised by the following preferred embodiments: in general, the elimination of relatively large quantities of the $SiF_4$ can be carried out at temperatures above 100°C corresponding to pressures above 1 atmospheres gauge, although it is preferably carried out at temperatures in the range of from 160° to 240°C corresponding to pressures in the range of from 7 to 30 atmospheres gauge.

The aqueous $H_2SiF_6$ solutions may be of any concentration, although it is preferred to use solutions containing from 20 to 45% by weight of $H_2SiF_6$.

Some of the water present in dilute $H_2SiF_6$ solutions can be removed by distillation before pressure separation, for which purpose a reduced pressure, more particularly a pressure of from about 50 to 400 mm Hg, is applied.

The gaseous $SiF_4$ which accumulates during pressure separation can be reacted by conventional methods to form salts, in particular alkali salts of fluosilicic acid. However, the $SiF_4$ is preferably hydrolysed in aqueous medium into $H_2SiF_6$ and $SiO_2$ and the $H_2SiF_6$ returned to the process after the $SiO_2$ has been separated off. In one particularly preferred embodiment, the gaseous $SiF_4$ accumulating during pressure separation is hydrolysed with the aqueous $H_2SiF_6$ solution flowing into the process and following separation of the $SiO_2$ the solution is introduced into the autoclave.

The pressure separation stage can be carried out either at intervals or even continuously in suitable autoclaves. In one particular embodiment, pressure separation can be carried out in two or more stages, optionally at different pressures, in the form of a cascade. The aqueous HF-containing phase obtained during pressure separation is distilled under reduced pressure, distillation being carried out with particular advantage in the form of fractional distillation, so that an aqueous hydrofluoric acid containing about 35 to 39% by weight of HF and water are obtained in addition to the $H_2SiF_6$-containing sump phase.

The sump phase is preferably returned to the process, optionally following the removal of troublesome impurities.

In another embodiment, mineral acids, for example $H_2SO_4$, can be added to the solution to be separated.

The process according to the invention enables $H_2SiF_6$ solutions to be worked up into aqueous hydrofluoric acid and $SiF_4$ or $SiO_2$ at temperatures below 300°C, the only secondary product formed being water which does not have to be subjected to any special purification process. In general, the process according to the invention can be carried out as follows: a fluosilicic acid, preferably of the highest possible concentration, is subjected to pressure separation at a temperature in the range of from 100° to 300°C, preferably in the range of from 150° to 250°C, under a pressure of from 3 to 80, preferably from 7 to 30 atmospheres gauge, a phase essentially containing $SiF_4$ being formed in the gaseous zone. Surprisingly, the higher the temperature and hence the pressure, the higher is the $SiF_4$-content of the vapour, whilst the HF content is greatly reduced.

Following the pressure separation stage, the liquid phase is worked up by distillation from which a head product substantially free from $SiF_4$ can be obtained. The $H_2SiF_6$ still present in the liquid phase is thus enriched in the sump of the column during distillation, whilst a pure aqueous HF is obtained as the head product. The lower the temperature and pressure are kept during distillation, the lower the $H_2O$- and HF-contents of the fluosilicic acid left in the sump and, hence, the greater the proportion of pure HF which can be distilled off. As already mentioned, the sump phase is returned to the pressure separation stage together with the fluosilicic acid present in it, optionally following the removal of troublesome impurities.

The gaseous phase which accumulates during the pressure separation stage, consisting essentially of steam and $SiF_4$, can initially be relieved of pressure and cooled in order to recover the $SiF_4$ which can be further processed into salts of fluosilicic acid. In one advantageous embodiment of the process, however, $SiF_4$ is hydrolysed with water to form $H_2SiF_6$ and $SiO_2$ and the $H_2SiF_6$ is returned to the process following separation of the $SiO_2$. In this embodiment of the process, all the $H_2SiF_6$ is reacted to form HF and $SiO_2$.

The aqueous $H_2SiF_6$ solutions to be worked up by the process according to the invention should preferably have a concentration in the range of from 20 to 45% by weight. More dilute solutions are best concentrated in a preliminary stage or directly used for hydrolysing the $SiF_4$ separated off. In the case of preconcentration, the dilute $H_2SiF_6$ solution is concentrated at reduced pressure.

Figure 2:
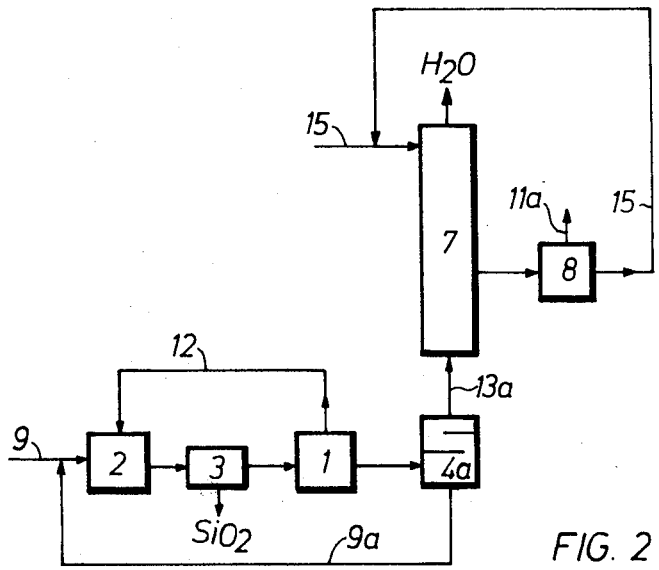

Two special embodiments of the process according to the invention are diagrammatically illustrated in FIGS. 1 and 2 of the accompanying drawings, the reference numerals used in those Figures having the following meaning:

1 = a single-stage or multistage autoclave for pressure separation of the fluosilicic acid;
2 = hydrolyser;
3 = filter unit, for example rotary filter or decanter;
4 = distillation column;
4a = separation column;
5 = purification stage for the sump recycle;
6 = distillation column;
7 = adsorption column, for example fluidised bed
8 = heater, for example rotary kiln;
9 = aqueous $H_2SiF_6$-containing starting solution
9a = cycled $H_2SiF_6$-containing solution;
10 = impurities (for example phosphoric acid) removed from the $H_2SiF_6$-circuit;
11 = 35 to 39% HF;
11a = 100% HF;
12 = $SiF_4$;
13 = dilute aqueous HF solution with a certain proportion of impurities, especially $H_2SiF_6$;
13a = HF—$H_2O$ vapour mixture;
14 = NaF;
15 = $NaHF_2$.

In the embodiment shown in FIG. 1, the aqueous $H_2SiF_6$-containing solution is initially concentrated in distillation column 6 to an $H_2SiF_6$ content of from 30 to 40% by weight. The concentrated solution is then transferred to autoclave 1 in which the $H_2SiF_6$ is separated into $SiF_4$ and HF. The $SiF_4$ is removed in vapour form, whilst the HF is removed in the form of an aqueous phase. The aqueous phase still contains unseparated $H_2SiF_6$ and involatile impurities.

In a batch test carried out in an autoclave heated to 20 atmospheres gauge (183°C) at constant pressure and at a temperature in the sump of the autoclave increasing up to 215°C it was possible to blow off for example from 20.55 kg of a 39.4% $H_2SiF_6$ 10.32 kg of gas with the composition: 5.05 kg of $H_2O$; 5.02 kg of $SiF_4$ and 0.25 kg of HF. An aqueous solution (total 10.22 kg) containing 1.67 kg of HF and 0.95 kg of $H_2SiF_6$ was left behind in the sump.

Following the addition of water, the $SiF_4$-containing phase is then hydrolysed into $SiO_2$ and $H_2SiF_6$ in the hydrolyser 2. The $SiO_2$ formed is separated off in a filter and the aqueous $H_2SiF_6$-containing phase 9a delivered to distillation column 6.

The HF-containing liquid 13 from the autoclave is distilled in a column 4, an HF-water azeotrope (35 to 39% of HF) being obtained in the middle part of the column and water in the upper part of the column, whilst the impurities and the residual $H_2SiF_6$ are left behind in the sump of the column. The aqueous phase from an autoclave treatment which, in addition to 7.6 kg of $H_2O$, contained 1.67 kg of HF and 0.95 kg of $H_2SiF_6$, was distilled in column 4 under a pressure of 50 mm Hg. It was possible to remove 3.89 kg of a 35% HF, whilst the sump had the following composition on completion of distillation: 1.25 kg of $H_2O$, 0.95 kg of $H_2SiF_6$ and 0.31 kg of HF.

The sump liquid is then returned to the distillation column 6, optionally through a purification stage 5 for separating off impurities 10, particularly phosphoric acid.

In the embodiment shown in FIG. 2, the $H_2SiF_6$-containing solution 9 to be worked up is initially hydrolysed in the hydrolyser 2 with the $SiF_4$-containing vapour coming from the autoclave 1 into solid $SiO_2$ and an $H_2SiF_6$-containing solution. The $SiO_2$ is separated off in the filter 3, and the resulting solution is separated in the autoclave into $SiF_4$ and an aqueous solution essentially containing HF. This solution 13 is then separated in a separation column 4a into an HF/$H_2O$ mixture 13a and a sump phase 9a which essentially still contains $H_2SiF_6$ that was not separated in the autoclave 1. The HF/steam mixture 13a leaving the separation column 4a is then treated with solid NaF 15 in 7, preferably in the form of a fluidised bed, in order to separate the HF from the HF/steam mixture in the form of $NaHF_2$ 14. The sodium hydrogen fluoride is then thermally separated in a heater 8 into 100% HF 11a and NaF 15.

The process according to the invention is not confined to the two embodiments described above. Thus, other processes can be used for working up the HF azeotrope or for further working up the $SiF_4$ vapour. Processes of this kind have been repeatedly described and do not form any part of the invention.

What is claimed is:

1. A process for recovering hydrofluoric acid from aqueous fluosilicic acid consisting essentially of water and fluosilicic acid which comprises heating said aqueous fluosilicic acid at a temperature of from 100° to 300°C. and under a pressure of from 7 to 80 atmospheres gauge to obtain a hydrogen fluoride containing aqueous phase and a silicon tetrafluoride containing gaseous phase and separating said hydrogen fluoride containing aqueous phase and silicon tetrafluoride containing gaseous phase.

2. The process of claim 1 wherein said temperature is from 150° to 250°C. and said pressure is from 7 to 30 atmospheres gauge.

3. The process of claim 1 wherein said aqueous fluosilicic acid contains about 20 to 45% by weight of $H_2SiF_6$.

4. The process of claim 1 wherein said hydrogen fluoride containing aqueous phase is concentrated by distillation at a reduced pressure of 50 to 400 mm Hg.

5. The process of claim 1 wherein the silicon tetrafluoride containing phase is hydrolyzed in an aqueous medium to silicon dioxide fluosilicic acid and the aqueous fluosilicic acid is recycled as starting material for said process.

* * * * *